United States Patent
Marshall (10) Patent No.: US 7,348,528 B2
(45) Date of Patent: Mar. 25, 2008

(54) DISTANCE MEASURING SYSTEM

(76) Inventor: Daniel R. Marshall, 3130 Victory View Dr., Boise, ID (US) 83709

( * ) Notice: Subject to any disclaimer, the term of this patent is extended or adjusted under 35 U.S.C. 154(b) by 0 days.

(21) Appl. No.: 11/312,034

(22) Filed: Dec. 20, 2005

(65) Prior Publication Data

US 2007/0138371 A1 Jun. 21, 2007

(51) Int. Cl.
*G02B 7/04* (2006.01)
*G02B 27/40* (2006.01)
*G02B 27/64* (2006.01)

(52) U.S. Cl. .................................. 250/201.3; 359/383
(58) Field of Classification Search ............ 250/201.3; 359/368, 383, 388, 389; 356/624
See application file for complete search history.

(56) References Cited

U.S. PATENT DOCUMENTS

| | | | |
|---|---|---|---|
| 3,721,827 A * | 3/1973 | Reinheimer | 250/201.3 |
| 4,734,570 A | 3/1988 | Horikawa et al. | |
| 4,798,948 A | 1/1989 | Neumann et al. | |
| 5,963,366 A | 10/1999 | Nakamura et al. | |
| 6,370,422 B1 * | 4/2002 | Richards-Kortum et al. | 600/478 |
| 6,449,087 B2 * | 9/2002 | Ogino | 359/383 |
| 6,717,726 B2 * | 4/2004 | Boehm et al. | 359/388 |
| 6,879,440 B2 | 4/2005 | Cemic et al. | |

OTHER PUBLICATIONS

Principles of Optical Disc Systems, by G. Bouwhuis, et al., Published 1985, pp. 70 Through 81.
AXSYS Technologies, Inc.—Lasertrac LF100 Laser Autofocus System, Brochure Published at http://www.axsys.com/p-lasertrac.php, Last Viewed Feb. 10, 2006.
Applied Scientific Instrumentation, CRIFF Continuous Reflective-Interface Feedback Focus System, Published at http://www.asiimaging.com/criff.html, Last Viewed on Feb. 10, 2006.

* cited by examiner

*Primary Examiner*—Georgia Epps
*Assistant Examiner*—Suezu Ellis
(74) *Attorney, Agent, or Firm*—Steven C. Johnson; Stephen M. Nipper; Dykas, Shaver & Nipper, LLP (57) ABSTRACT

A distance measuring device capable of being used in microscopes or other optical systems. Embodiments of the invention employ one or more scanning mirrors to scan a reference beam over a target to be inspected. The reference beam is returned and detected by a photodetector. The reference beam may be created by using a knife-edge element which allows the outgoing reference beam and incoming reference beam to follow the same path so that the apparent motion of the spot on the target surface is not detected by the photodetector. The photodetector generates an electronic signal corresponding to the displacement of the target away from the ideal focal point. The electrical signal may be used to drive a servomechanism to displace either the target or the microscope objective lens to bring the target in focus.

17 Claims, 4 Drawing Sheets

DISTANCE MEASURING SYSTEM

FIELD OF THE INVENTION

The invention relates generally to an apparatus for measuring distance to a surface, and more particularly to measuring distance to a target surface through an optical system for purposes that include adjusting focus in an optical system.

BACKGROUND OF THE INVENTION

A microscope is an optical instrument that has historically employed two or more lenses to make enlarged images of minute objects. In the so-called compound microscope, an objective lens is placed near a target to be viewed and the user views an image of the target through an eyepiece lens. In many installations, the eyepiece lens is replaced with a camera, often a digital camera using a charge coupled device as an imaging element.

Microscopes are commonly used to inspect parts in industrial manufacturing operations. To use a manually focused microscope, the operator typically adjusts the position of the entire microscope along an axis defined by the center of the objective lens and the eyepiece lens, changing distance between the objective lens and the object, thus adjusting the microscope's region of best focus to place it on the target surface to be imaged. Alternatively, the target surface may be moved axially to place the target surface at the microscope's region of best focus. The lens or target surface is typically moved using a precision mechanism. In industrial inspection applications, the microscope may be automatically focused by the use of an electronic focus sensing system. The focus sensing system produces an electronic output signal that is used to command a precision servomechanism to maintain the target within the best focus region. In one class of microscope, an "infinity corrected" objective lens may be moved independently of the eyepiece to focus the microscope. Infinity corrected objective lenses are especially well suited to servomechanism controlled focus applications, because the servomechanism need only move the objective lens, rather than the target or the entire microscope.

Prior art devices often project a spot of light through the microscope objective onto a target surface and collect returning light to generate a focus error signal. Some prior art devices sense focus by projecting a line of light onto the target surface. In astigmatic systems, the projected line is created by placing a toric lens between the light source and the objective lens. A toric lens has at least one non-axially symmetric surface formed by a section of a torus, and in the limit where one radius of curvature becomes infinite, is a cylinder lens. Light reflected from the target surface returns through the objective lens and is diverted to a focus sensing module that generates an electric focus output signal. In this type of system, the focus output signal represents an average of the target surface distance sensed along the line, also called "line averaging." Such systems typically include a servomechanism to maintain the focus automatically by driving the precision mechanism to displace the target surface or the objective lens. It should be noted that this method of projecting a focused line is often not itself an integral part of the method of focus sensing, but only a way of extending the sensed region to provide an averaged focus error signal. Various methods of focus sensing may be used with this line averaging technique.

However, line averaging inefficiently uses light because the focus line typically diverges strongly after reflection, thus reducing the amount of light collected by the objective lens. This technique is particularly inefficient on specular surfaces, meaning mirror-like surfaces. Also, aberrations, particularly astigmatism aberrations, can cause wave front errors that degrade or bias the focus output signal. Moreover, because the amount of astigmatism introduced by the toric lens is fixed, the user cannot choose a length of line that is appropriate to the specific application, nor can computer-based image processing systems direct the focus sensing spot to a specific location.

Many common optical systems, such as laser printers, include scanning systems that effectively form a line by scanning a spot of light over a surface at a relatively high speed. These systems often generate the line by employing a multi-faceted rotating mirror. However, this type of system is relatively complex, is often expensive, and is prone to measurement errors caused by artifacts introduced by the rotating mirror. Furthermore, a precision multi-faceted mirror scanner is generally relatively expensive and difficult to produce. Polygon scanning systems have typically not been used in focus sensing systems for reasons of cost, complexity and size.

Focus sensing systems using the techniques described above can only sense focus along a single, nominally straight line. Astigmatic systems generate an average focus output signal based upon the axial distance from the objective lens to the target surface along the line, and intrinsically average over the line. However, irregular target surfaces often may benefit from an average focus signal be generated over a two-dimensional area, or require that the location of the sample point on the target surface for generating the focus signal be randomly selectable.

Accordingly, there is a need for a distance measuring system that is capable of generating focus error information from: 1) an average of distance from an objective lens to a target surface sensed along a selectable line on the target surface, 2) an average of distance information sensed over an area defined on the target surface, or 3) distance information sensed from a selectable location on the target surface. This distance measuring system should be capable of being installed on a microscope without substantially interfering with the microscope's viewing and inspection properties. The system should be inexpensive and should generate relatively little vibration or other scan-related artifacts.

SUMMARY OF THE INVENTION

Embodiments of the invention include a distance measuring system that is capable of selectively sensing distance along a line. Other embodiments include selectively measuring distance in a two-dimensional area, called a patch, defined on the target surface or from any point selected within the patch. These embodiments are relatively inexpensive and may be adapted for use in a microscope or other industrial inspection or measurement systems with a minimum of impact on the optical characteristics of the original system. The distance information may be used to drive a servomechanism to adjust focus, or alternatively to generate data regarding the topography of the target surface.

Embodiments of the present invention include a light source emitting a collimated reference beam of light. Any portion of the reference beam on one side of an optical axis is blocked by a knife-edge element. The remaining outgoing reference beam travels to the target surface, where it is reflected as an incoming reference beam on the opposite side of the optical axis. The incoming reference beam is diverted by the reflecting surface of the knife-edge element to a photodetector that generates an electronic output signal according to the position of the incoming reference beam on the surface of the photodetector. The signal generally corresponds to the distance from the objective lens of the microscope to the target surface and may be used to generate an output signal. The knife-edge element enables the incoming reference beam to generally follow the path that would have been taken by the blocked portion of the outgoing reference beam.

In some embodiments of the invention, a scanning mirror controllably deflects the outgoing reference beam and the incoming reference beam. Because the two reference beams generally follow the same optical path, the deflection of the incoming reference beam compensates for the deflection of the outgoing reference beam, so that the position of the incoming reference beam on the surface of the photodetector is generally independent of the deflection of the outgoing reference beam made by the scanning mirror. In this way, the measured distance is unaffected by scanning the outgoing reference beam along the target.

In other embodiments of the invention, a second scanning mirror is used in concert with the first scanning mirror. The two scanning mirrors each deflect the outgoing reference beam independently, so that the distance to a random point on the target surface may be selectively measured. When the first scanning mirror is configured to scan along a first line and the second scanning mirror is configured to scan along a second line roughly orthogonal to the first line, the target surface may be scanned in a continuum of patterns which includes straight or curved lines, Lissajous figures and raster patterns. The resulting distance data may be averaged to generate a single distance datum, or may be sampled to generate an array of distance data. This distance data may be used to characterize the elevation of the target surface, or may be used to generate an output signal. Moreover, it may be used to recreate an image having an extremely large depth of focus—one that is many times larger than the classical limit imposed by the defocus of a fixed objective. In some embodiments, an image having an extremely large depth of focus may be formed by synchronizing the scanning mirrors with imaging circuitry.

Thus, the distance measurement system may be used to directly measure the topology of the target surface, to correct focus by commanding the precision mechanism to displace the target surface according to the focus output signal, or to enhance the depth properties of the image itself.

The purpose of the foregoing Abstract and Summary is to enable the public, and especially the scientists, engineers, and practitioners in the art who are not familiar with patent or legal terms or phraseology, to determine quickly from a cursory inspection, the nature and essence of the technical disclosure of the application. Neither the Abstract or the Summary are intended to define the invention of the application, which is measured by the claims, nor is it intended to be limiting as to the scope of the invention in any way.

Still other objects and advantages of the present invention will become readily apparent to those skilled in this art from the following detailed description describing only the preferred embodiment of the invention, simply by way of illustration of the best mode contemplated by carrying out my invention. As will be realized, the invention is capable of modification in various obvious respects all without departing from the invention. Accordingly, the drawings and description of the preferred embodiment are to be regarded as illustrative in nature, and not as restrictive in nature.

BRIEF DESCRIPTION OF THE DRAWINGS

FIGS. 2 and 3 are side views of the reference beam landing on the target surface according to embodiments of the present invention.

DESCRIPTION OF THE PREFERRED EMBODIMENTS

While the invention is susceptible of various modifications and alternative constructions, certain illustrated embodiments thereof have been shown in the drawings and will be described below in detail. It should be understood, however, that there is no intention to limit the invention to the specific form disclosed; on the contrary, the invention is to cover all modifications, alternative constructions, and equivalents falling within the spirit and scope of the invention as defined in the claims.

Microscopes are used to examine minute objects by enlarging an image. In a classical compound microscope, the microscope has an objective lens and an eyepiece lens that define an image beam passing through the lenses. The image beam is formed from light reflected from a target surface. The target surface is in focus when located at the in-focus region, a distance away from the objective lens defined by the optical characteristics of the combination of the objective and eyepiece lenses. When the image provided by the microscope is out of focus, focus may be corrected by displacing the target surface in an axial direction defined by the image beam, until the target surface arrives at the region of best focus.

Prior focus systems have commonly employed a light beam passing through a toric lens to generate a fixed line on the target surface in order to create an averaged focus error signal value. The target surface reflects this beam to generate an output signal based on the average distance of the line from the objective lens. In this type of system, the location line is fixed and is not adaptable to provide the best focus information from different target surfaces.

Embodiments of the present invention provide ways to measure the distance of the target surface from the objective lens over a point, line or area, so that a signal corresponding to the distance may be generated. The signal may be used to drive a servomechanism that displaces the target surface, or may be analyzed to characterize the topology of the target surface. These embodiments are compact, relatively inexpensive to implement, and may be packaged to insert into a microscope stack with a minimum of degradation of the microscope image.

In the following description and in the figures, like elements are identified with like reference numerals.

Figure 1:
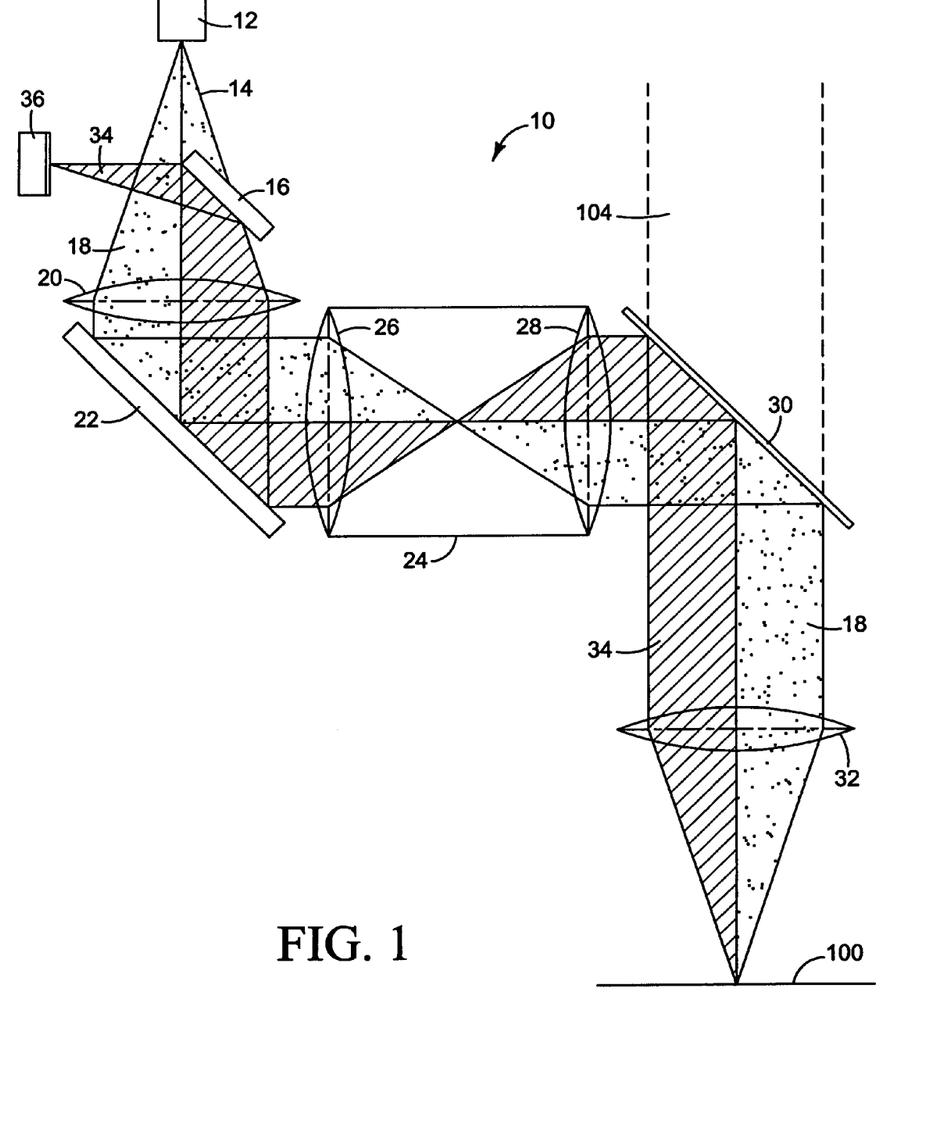
FIG. 1 shows an embodiment of the present invention having a single scanning mirror.

FIG. 1 shows a distance measuring system 10 employing a single scanning mirror according to an embodiment of the invention. In FIG. 1, light source 12 emits an outgoing beam of light 14. A portion of outgoing beam 14 is blocked by a knife-edge element 16. The remaining portion of outgoing light beam 14 creates an outgoing reference beam 18, shown by a first type of shading in FIG. 1. Outgoing reference beam 18 passes through a collimating/focusing lens 20 and is deflected by a scanning mirror 22 through an afocal relay 24. Afocal relay 24 has a first relay lens 26 and second relay lens 28. Outgoing reference beam 18 is then reflected by beamsplitter 30 through objective lens 32 and onto the surface of target 100.

Target surface 100 reflects outgoing reference beam 18 through objective lens 32 to create incoming reference beam 34, shown as a second type of shading in FIG. 1. Incoming reference beam 34 travels the reverse path taken by outgoing reference beam 18, passing in order, beamsplitter 30, afocal relay 24, scanning mirror 22, and through collimating/focusing lens 20. Beam 34 is then reflected by a mirrored surface of knife-edge element 16 to impinge on photodetector 36.

The outermost vertex, or knife-edge, of knife-edge element 16 defines a plane that roughly bisects the optical path followed by the reference beams: the path on one side of the plane conducts outgoing reference beam 18, and the path on the other side of the plane conducts the incoming reference beam 34. Knife-edge element 16 is preferably positioned so that the knife-edge is aligned with the optical axis defined by objective lens 32. The optical axis is defined such that light rays passing through the optical path along the system optical axis are not deflected by objective lens 32. Typically, the optical axis passes through the center of objective lens 32, typically a symmetric lens. By precisely subtending the incoming reference beam 34 over the portion of the optical path not taken by outgoing reference beam 18, knife edge element 16 performs multiple functions, acting as a knife-edge in the outgoing path, as a knife-edge in the incoming path, as a lossless beamsplitter, and as a fold mirror.

Objective lens 32 focuses the outgoing beam 18 onto a small spot on target surface 100 as long as the beam is correctly focused on the target surface. The scanning mirror deflects outgoing beam 18 so that the spot traces a pattern on target surface 100. The amount of deflection depends on the angular rotation of the scanning mirror and the focal lengths of the intervening lenses. Reflected incoming reference beam 34 generally follows a return path parallel to the path taken by outgoing beam 18 and is deflected approximately the same amount by scanning mirror 22, so that the apparent motion of the spot on target surface 100 does not appear as a deflection of the spot made by incoming reference beam 34 on the surface of photodetector 36. Thus, the location of the spot that incoming reference beam 34 makes on the surface of photodetector 36 is isolated from the deflection of the reference beams 18 and 34 by scanning mirror 22.

Figure 2:
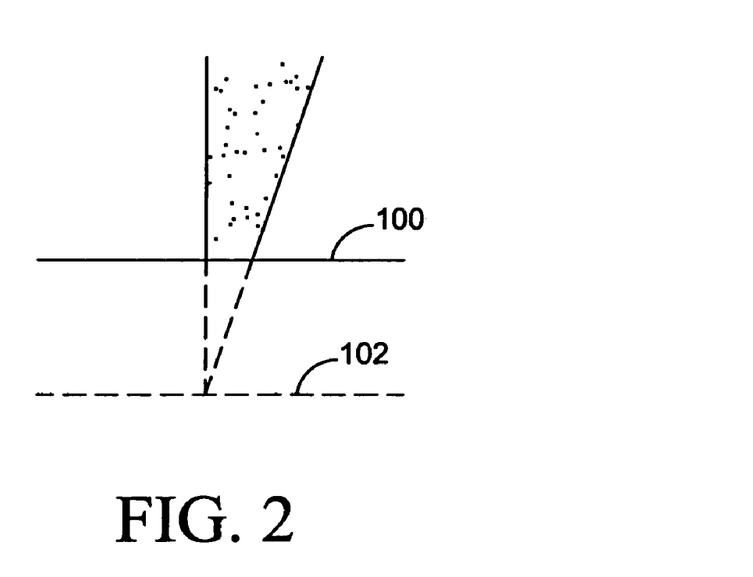
FIG. 2 shows the reference beam when the target surface is above the ideal focal point.
Figure 3:
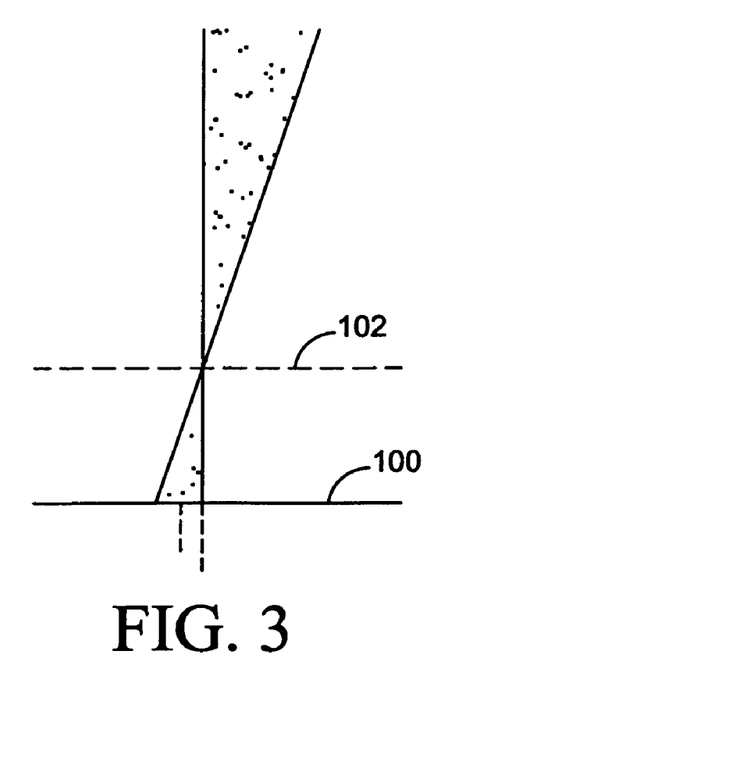
FIG. 3 shows the reference beam when the target surface is below the ideal focal point.

Photodetector 36 is used to measure the axial displacement of target 100 from the ideal focal point, as illustrated in FIGS. 2 and 3. Referring to FIG. 2, when target surface 100 is above the ideal position at the system focal point, shown as a dotted line 102, outgoing reference beam 18 strikes the surface and appears as an extended patch of light rather than a sharply focused point. In the case where the surface is a diffuse reflector, the light patch appears to one side of the ideal focal point; to the right of center in the representation shown in FIG. 2. This apparent deflection of the spot generated by outgoing reference beam 18 is reflected back as incoming reference beam 34, shifting the location where reference beam 34 impinges photodetector 36 to one side. This shift is measured by photodetector 36 and is used to generate an electronic signal. FIG. 3 shows the condition when target surface 100 is below the focal point, again shown as line 102. In FIG. 3, outgoing reference beam 18 creates a diffused area to the left of the ideal focal point. This shift is transmitted by incoming reference beam 34 through the optical path, shifting the point of impingement on photodetector 36 to the opposite side from the condition shown in FIG. 2. In this way, photodetector 36 directly measures the distance as target surface 100 is displaced from the ideal focal point. It is important to distinguish between the lateral displacement of the spot formed on the detector by defocus and the lateral displacement of the spot formed on the target by the scanning mirror, as the motions are completely distinct and separate. The spot on the detector does not move laterally as the beam is scanned by the scanning mirror, but only moves laterally in response to defocus at the target. Thus it is possible to scan the spot on the target without affecting the focus error signal. The signal generated by photodetector 36 may be used to drive a servomechanism that moves target surface 100 in a direction that will bring it closer to the focal point.

Scanning mirror 22 is used to deflect both the incoming and outgoing reference beams so that the apparent spot on target surface 100 moves. When scanning mirror 22 is capable of rotating only about a single axis, the spot moves along a line on target surface 100. However, when scanning mirror 22 is capable of rotating about two axes, the spot appearing on target 100 may be placed anywhere within a two-dimensional area, referred to herein as a patch. The scope of the area is defined by the extent of angular rotation of scanning mirror 22.

Afocal relay 24 simultaneously retains the state of collimation of the light entering objective 32, and minimizes any tendency of the beam to move laterally with respect to the entrance pupil of objective 32. As a result, the transmission efficiency of the system is optimized, and the shape and location of the returning beam on the scanning mirror 22 are retained. With appropriate design and placement of lens 20 and the mirrored surfaced of knife-edge element 16, afocal relay 24 acts to prevent artifacts in the focus error signal that are introduced by having a long optical path.

In an embodiment of the invention, scanning mirror 22 is driven by a sinusoidal resonant scanner. Such resonant scanners are typically small, inexpensive, and low in power dissipation, making them ideal for compact mechanisms. However, other types of scanning mechanisms may be used, including polygon or prism scanners, holographic scanners, galvanometers, and electro-optic or acousto-optic scanners. The selection of the scanning mechanism depends on the cost, desired scanning speed, and whether the location of the spot on target surface 100 must be randomly selectable.

Sinusoidal resonant scanners typically rotate about a single axis, which in single mirror embodiments will generate a line along target surface 100. In some embodiments, scanning mirror 22 is capable of moving the scanned spot laterally much more quickly than the servomechanism can respond. This condition is generally easy to create because the inertia of the scanning mirror is generally much smaller than the inertia of a moving lens for moving target surface 100. As mirror 22 scans the spot across target surface 100, the output signal generated by photodetector 36 changes much faster than the servomechanism can respond. Therefore, the servomechanism tends to maintain a time average of the various points scanned by the moving spot.

In another embodiment, scanning mirror 22 is capable of rotating in two axes and the servomechanism tends to maintain a time average of the various points scanned by the moving spot over an area.

In some applications, target surface 100 may have holes in the area to be imaged, so that portions of the output signal are discontinuous. In an embodiment of the invention, the output signal may be sampled by an electronic control system and the samples may be examined to detect intact portions of the output signal. The servomechanism can be commanded to maintain focus by reference to those intact samples. A related method of maintaining focus is to freeze the state of focus during interruption of the signal. Another method is to generate a particular spot trajectory that minimizes interruptions by controlling the angular rotation of mirror 22. For example, if there is a slot on the surface of the sample, the scanned spot trajectory may be adjusted so that it crosses the slot at a large angle, minimizing the drop out duration of the focus output signal. This illustrates a particular benefit of some embodiments of the invention: spot trajectories and illuminated patch shapes may be customized to suit the surface under inspection, and the output signals generated may be effectively sampled, qualified, and processed to remove certain kinds of errors.

Light source 12 may be any light source, including an incandescent lamp having a pinhole mask. However, light source 12 should preferably have a relatively narrow bandwidth and high radiance. Such suitable light sources include a laser, laser diode, light emitting diode ("LED"), or super luminescent diode ("SLD"). A coherent, meaning extremely narrow bandwidth, light source is not required, and coherence may actually increase the effects of diffraction and interference of reference beams 18 and 34, which may degrade the distance measurement accuracy.

In a preferred embodiment, photodetector 36 is a position sensing detector. One such detector, a lateral effect photodiode, generates an electronic signal that is proportional to the lateral displacement of the impinging light spot from the center of the diode. Alternatively, photodetector 36 may be a spot detector, commonly implemented as a photodiode with a mask of slits or spots. Such detectors have high gain but are capable of detecting only a small deflection.

In a preferred embodiment, knife-edge element 16 is implemented as a rectangular prism with one mirrored surface, meaning a generally reflective surface. For the purposes of describing the invention, a prism is any polyhedron having two polygonal faces lying in parallel planes and where the other faces are parallelograms. In a preferred embodiment, the reflective surface is made by aluminizing the surface with coverage sufficient to reflect a majority of the impinging light. For best results, the mirrored surface of knife-edge element 16 should be reflectively coated all the way to the vertex located at the centerline of outgoing reference beam 18. Prior focus detection systems use knife-edge elements having a vertex considerably more acute than the 90 degree vertex shown in FIG. 1. It is difficult to manufacture a knife-edge element having a mirrored surface that extends all the way to the edge. In the focus system shown in U.S. Pat. No. 4,798,948, the knife-edge element consisted of a rectangular prism with a vertex machined to present a flat surface parallel to the axis of beam 14. This method requires an additional machining step and presents alignment problems in practice. Furthermore, the method shown in '948 conducts light within the prism, requiring an expensive optical glass or quartz prism. The present embodiment does not require a transmitting element because the incoming reference beam is reflected from the outside surface of the prism. Furthermore, the present rectangular shape assists in manufacturing the prism so that the aluminized surface extends all the way to the vertex. While a rectangular prism is preferred, any element capable of blocking a portion of light beam 14 and reflecting the resulting incoming reference beam 34 may be used.

Distance measurement system 10 may be installed in a microscope "stack," which typically includes a microscope objective, a coaxial illuminator, an eyepiece assembly, and a mounting bracket. In other words, the measurement system may be installed in the optical path between the objective lens and the imaging element of the microscope. Referring again to FIG. 1, visible light strikes target 100, passes through objective lens 32 and through beamsplitter 30, and continues as an image beam 104 to an eyepiece lens or a camera. Beamsplitter 30 is selected to transmit image beam 104 and reflect reference beams 18 and 34. Beamsplitter 30 may be a dichroic beamsplitter or any other beam splitter capable of separating the image and reference beams. For best beam separation using a dichroic beamsplitter, the light produced by light source 12 preferably should have a narrow spectrum. Preferably, beamsplitter 30 and the amplitude of light source 12 should be chosen so that the amplitude of any portion of the reference beams transmitted by beamsplitter 30 is much less than the amplitude of the image beam transmitted by beamsplitter 30.

The use of afocal relay 24 is not essential to the separation of the scanned spot's lateral motion at the target from the lateral motion at the detector. Its purpose is to provide spatial separation between the detection mechanism and the microscope stack while maintaining collimation of reference beams 18 and 34. Loss of collimation reduces distance measurement accuracy. As shown in FIG. 1, afocal relay 24 illustrates only one type of afocal relay, where lenses 26 and 28 have nominally equal focal lengths and unity magnification. However, relays of other magnifications may be used. Afocal relay 24 may include an aperture stop and a field stop (not shown) to physically limit the beam size and trajectories.

Figure 4:
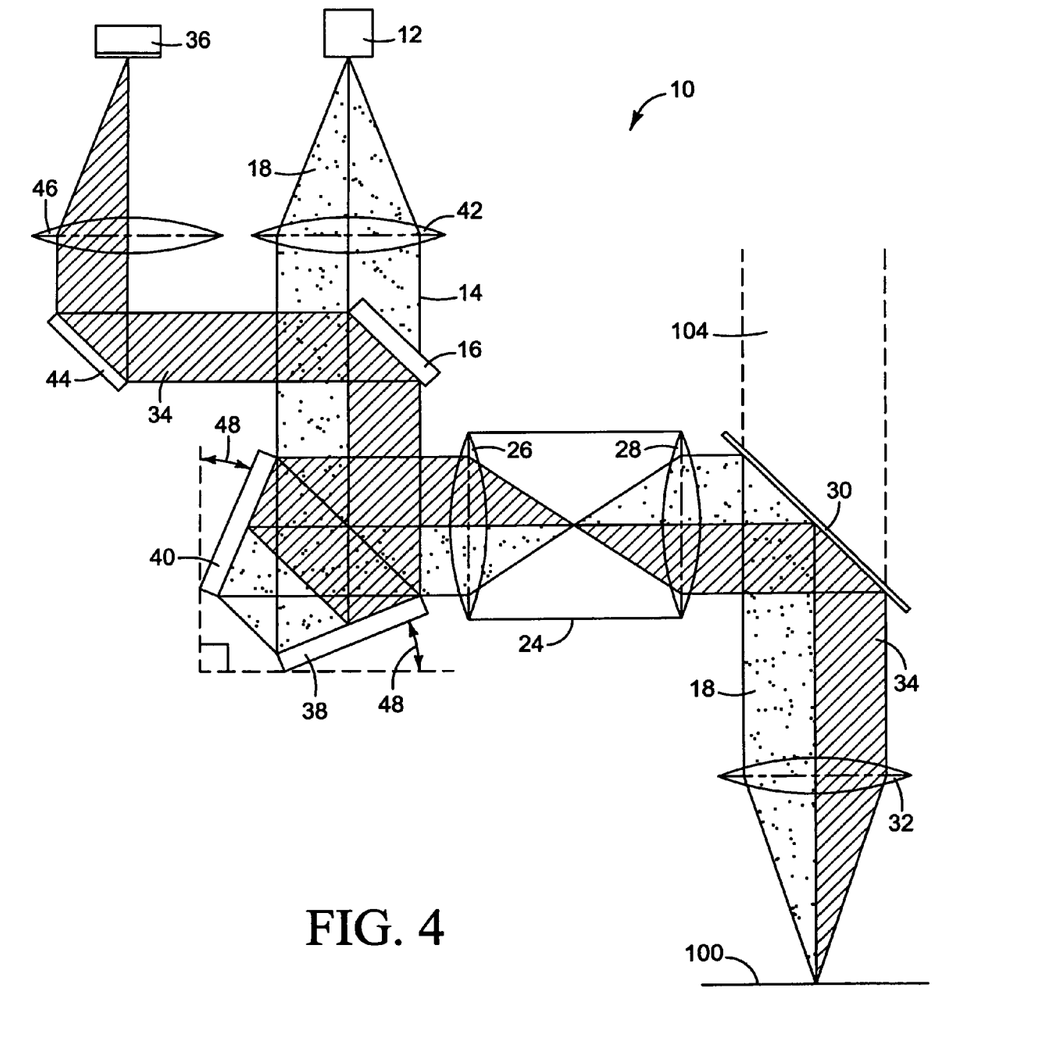
FIG. 4 shows an embodiment of the invention having two scanning mirrors.

FIG. 4 shows a distance measuring system employing two scanning mirrors according to an embodiment of the invention. A first scanning mirror 38 is configured to scan along a first plane, and a second scanning mirror 40 is configured to scan in a second plane not co-planar with the first plane. This configuration allows scanning in two dimensions to scan a patch on target surface 100. In a preferred embodiment, mirror 38 and mirror 40 are sinusoidal resonant scanning mirrors. The use of two resonant mirrors capable of scanning in only one axis is considerably less expensive than a single mirror capable of scanning in two axes because standard resonant scanning assemblies are readily available. The use of two mirrors may also offer certain control advantages, such as the ability to control scan frequency and phase separately.

The arrangement of first scanning mirror 38 and second scanning mirror 40 shown in FIG. 4 approximates a pentaprism. In a pentaprism arrangement, angles 48 are both 22.5 degrees when the mirrors are quiescent, allowing the two scanning mirrors to fold the beam in a compact manner. As another benefit, beams 18 and 34 are incident on the mirrors at 22.5 degrees instead of a more typical 45 degrees, minimizing the surface area of the mirror required to cover the beam which in turn reduces the size and inertia of the mirrors. A low inertia mirror generally enables higher scanning speeds. While the arrangement shown in FIG. 4 approximates a pentaprism wherein angles 48 are approximately 22.5 degrees, embodiments of the invention will operate at other angles. For example, angles 48 may be adjusted to route the reference beams to avoid other components in a microscope stack.

FIG. 4 also shows an alternative arrangement of the collimation lenses and the photodetector. In FIG. 4, light source 12 emits a light beam 14 through a collimation lens 42. Beam 14 passes by knife-edge element 16, which blocks one-half of beam 14 and creates output reference beam 18. A scanning mirror 38 reflects output reference beam 18 to a second scanning mirror 40, which reflects beam 18 through afocal relay 24. Beam 18 continues to reflect off of beamsplitter 30 through objective lens 32 onto target surface 100. As in the embodiment shown in FIG. 1, outgoing reference beam 18 reflects from the surface of target 100 to create incoming reference beam 34. Incoming reference beam 34 generally reverses the optical path defined by reference beam 18: reflecting from beamsplitter 30, passing through afocal relay 24, reflecting from second scanning mirror 40, and then reflecting from first scanning mirror 38. Incoming reference beam 34 reflects from a mirrored surface of knife-edge element 16 to a mirror 44, which reflects beam 34 through a decollimating lens 46 to impinge on the surface of photodetector 36. This arrangement of components results in generally the same output as the focus system described in FIG. 1, except that the collimation and focusing are now performed by two lenses rather than one. This arrangement allows easier alignment of the components in some applications, and allows photodetector 36 and light source 12 to be installed in the same plane on an electronic circuit board. Using one electronic circuit board is generally less expensive than using two circuit boards, because some interconnection wiring and additional mechanical support structure may be eliminated.

Mirrors 38 and 40 may be independently controlled to illuminate a particular point, line or patch on target surface 100. In an embodiment called quasi-area resonant scanning, both mirrors 38 and 40 are resonant scanning mirrors, and the scan frequencies differ by an amount greater than the frequency response of the focusing servomechanism. The result is a continuously moving line that scans over an elliptical region whose semi-major and semi-minor axes are proportional to the separate amplitudes of the two scanners. In a similar embodiment called synchronous resonant area scanning, mirrors 38 and 40 have a controlled frequency and phase relationship wherein the scanning frequency of mirror 38 is an integer multiple of the scanning frequency of mirror 40. The resulting spot trajectories are called "Lissajous figures" and include lines, circles, ellipses, and more complex patterns. This embodiment enables the selection of a trajectory that avoids a particular region on target surface 100. For example, a circle may be selected to avoid a hole in target surface 100. As before, a dichroic beamsplitter or a band rejection filter may be used to remove the trace of reference beams 18 and 34, allowing unobstructed viewing of target surface 100.

In another embodiment, a resonant scanning mirror may be used for one mirror, while the other mirror is deflected by a random access scanner. This embodiment is particularly useful for raster scanning.

In yet another embodiment, mirrors 38 and 40 may both employ random access scanners, so that all points with a rectangular area on target surface 100 are addressable. Random access scanners are typically more expensive and have higher inertia than resonant scanners, but enable more complex scan patterns. Also in this embodiment, the scan pattern may be adjusted real-time to accommodate an arbitrary target surface.

While the knife-edge element employed to produce a focus error signal in the embodiments shown in FIGS. 1 and 4 is helpful, it is not necessary in all embodiments of the invention. In particular, it is possible to generate focus error signals by means other than using a knife edge. However, employing the knife-edge element is particularly useful when the target surfaces may be either specular or diffuse.

Figure 5:
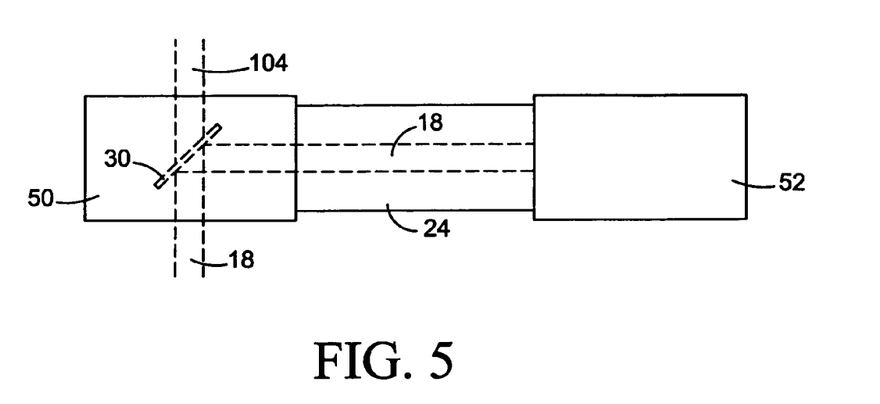
FIG. 5 shows an embodiment of the invention packaged for use on a microscope.

FIG. 5 illustrates an embodiment of the invention adapted to fit a microscope. Stack housing 50 contains beamsplitter 30 and is adapted to fit into the microscope stack. Stack housing 50 is configured to allow the image beam 104 to pass through to the microscope eyepiece or camera. In the exemplary embodiment shown, objective lens 32 is part of the microscope and is not shown in FIG. 5. The light source 12, photodetector 36, knife-edge element 16 and required scanning mirrors and collimation lenses are housed in detector housing 52. FIG. 5 shows that afocal relay 24 is useful to locate the components contained in housing 52 well away from the microscope stack without degrading the focus sensing properties of the focus sensing system. While afocal relay 24 is not necessary in some embodiments, it is often helpful to improve the operation of the focus sensor, such as by eliminating false "in focus" signals caused by long optical path lengths.

Figure 6:
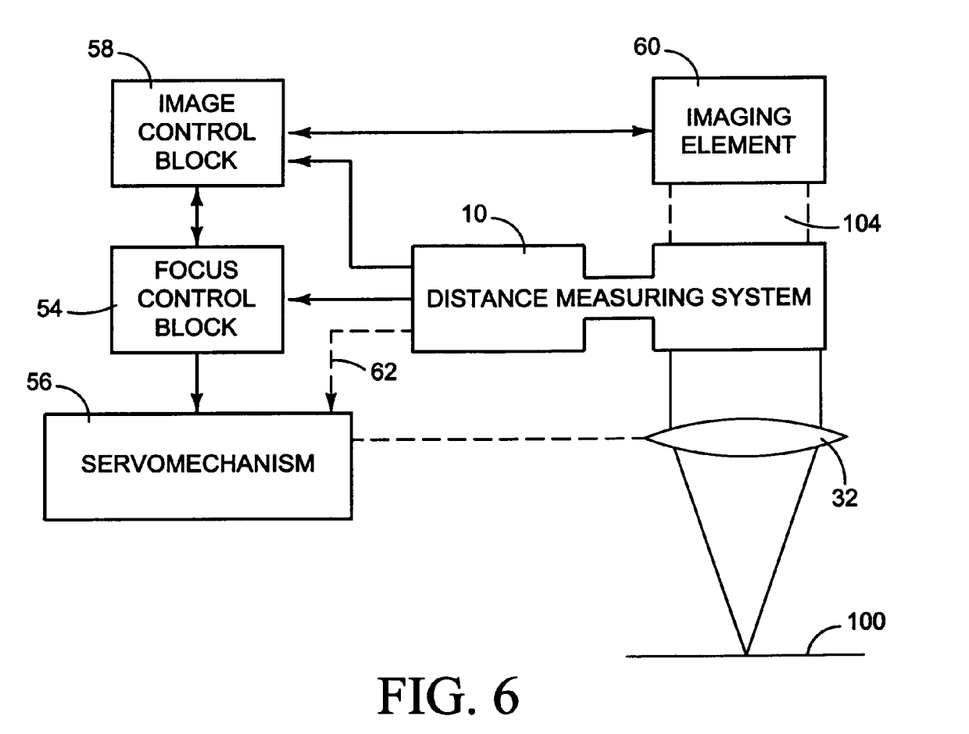
FIG. 6 shows a block diagram of embodiments of the invention.

In some embodiments, the speed of the scanning element may be adjusted so that the focus servomechanism follows the motion of the focus sensing spot with sufficiently small error so that the area immediately around the moving spot remains in focus. At the same time, a synchronized imaging device may be used to collect the portion of the area immediately around the focus sensing spot in its trajectory. In this way, a composite image may be built up whose depth of focus greatly exceeds that of a static image. FIG. 6 is a block diagram showing the relationship of the control elements in such an embodiment. In FIG. 6, distance measuring system 10 presents distance data or a focus error signal to focus control block 54, which in turn controls servomechanism 56. Distance measuring system 10 presents scan position information to image control block 58. Focus control block 54 presents distance data to image control block 58. Image control block controls imaging element 60, which senses the image formed by image beam 104. Using the scan position information, image control block 58 synchronizes the collection and storage of image data supplied by image element 60 with the current location of the focus spot. Imaging element 60, working in concert with image control block 58, collects the portion of the image immediately surrounding the focus sensing spot in its trajectory. Image control block 58 may build up a composite image from the collected image portions. Because each element of the composite image is in focus at the time it is collected, the entire composite image will be in focus. Thus, the effective depth of focus can far exceed that obtained using static focus setting. Optionally, the distance data provided by focus control block 54 may be used to enhance the image, for example, by adding false color elevation information.

Focus control block 54 and image control block 58 may be implemented as discrete analog electronic circuitry, discrete digital electronic circuitry, or a combination of analog and digital electronic circuitry. In a preferred embodiment, image control block 58 may be implemented as a digital computer containing memory, which may include an image buffer, and a central processing unit. Imaging element 60 may be a computer controlled, pixilated camera or other digital imaging devices such as a charge-coupled device.

In some applications, a very large depth of focus is not required; rather, the focus should be set using an average of the distance measured over the target. Referring again to FIG. 6, distance measuring system 10 presents distance data or a focus error signal to focus control block 54. If the scan frequency employed by system 10 is higher than the combined frequency response of focus control block 54 and servomechanism 56, then the focus will be obtained over an average of the distance measured. Using the embodiments described above, the focus may be obtained over a line, Lissajous figure, or a patch on the target surface. Focus control block 54 may be implemented to have an adjustable frequency response to obtain an average focus, a precise focus that follows the scanning spot, or a focus selected from a continuum between the average and precise focus modes. Note that when an average focus is required, it may be possible to eliminate image control block 58 and allow imaging element 60 to capture image data independently of the scan position. In other embodiments, system 10 may supply focus error data directly to servomechanism 56, allowing elimination of control block 54, as shown by signal 62 in FIG. 6.

From the foregoing, it will be appreciated that the present invention provides a significant advance in the art of automatic focusing systems generally, and particularly in industrial inspection systems requiring an inexpensive, compact way to adjust the focus of visual inspection system or a way to measure the elevation of a target surface.

The exemplary embodiments shown in the figures and described above illustrate but do not limit the invention. It should be understood that there is no intention to limit the invention to the specific form disclosed; rather, the invention is to cover all modifications, alternative constructions, and equivalents falling within the spirit and scope of the invention as defined in the claims. For example, while embodiments of the present invention were developed for use in controlling the focus of microscopes and for measuring topography of target surfaces through a microscope, the invention is not limited to use with microscopes and may be used with other optical systems that operate similarly to a compound microscope, including laser welders or laser cutting machines. While the invention is not limited to use with microscopes, it is expected that various embodiments of the invention will be particularly useful in such devices. Hence, the foregoing description should not be construed to limit the scope of the invention, which is defined in the following claims.

What is claimed is:

1. A distance measuring system for use in an optical system capable of examining a target surface and having an objective lens defining a system in-focus region, said system comprising:
   a light source emitting an outgoing reference beam of light, wherein a portion of the outgoing reference beam is reflected from the target surface as an incoming reference beam;
   a photodetector positioned in the path of the incoming reference beam and adapted to generate an electronic signal according to the position of the incoming reference beam on the surface of the photodetector;
   a first scanning mirror capable of controllably deflecting the outgoing reference beam and the incoming reference beam; and
   a reflecting knife-edge element defining a plane, the knife-edge element positioned to obstruct any portion of the outgoing reference beam on a first side of the plane and to subtend the incoming reference beam on the first side of the plane;
   whereby the controllable deflection of the outgoing reference beam allows selection of a point on the target surface for generating the electronic signal, and the electronic signal may be used to adjust the displacement of the target surface.

2. The distance measuring system of claim 1, wherein the reflecting knife-edge element comprises a rectangular prism having at least one reflective surface, and wherein the knife-edge element does not conduct the incoming reference beam.

3. The distance measuring system of claim 1, wherein the first scanning mirror is driven by a sinusoidal resonant scanner.

4. A distance measuring system for use in an optical system capable of examining a target surface and having an objective lens defining a system in-focus region, said system comprising:
   a light source emitting an outgoing reference beam of light, wherein a portion of the outgoing reference beam is reflected from the target surface as an incoming reference beam;
   a photodetector positioned in the path of the incoming reference beam and adapted to generate an electronic signal according to the position of the incoming reference beam on the surface of the photodetector;
   a first scanning minor capable of controllably deflecting the outgoing reference beam and the incoming reference beam;
   a beamsplitter positioned to reflect the outgoing reference beam, to reflect the incoming reference beam, and to transmit an image beam that passes through the objective lens;
   whereby the controllable deflection of the outgoing reference beam allows selection of a point on the target surface for generating the electronic signal, and the electronic signal may be used to adjust the displacement of the target surface, and
   whereby the beamsplitter separates the outgoing reference beam from the image beam.

5. The distance measuring system of claim 4, further comprising:
   an afocal relay positioned to transmit the outgoing reference beam and the incoming reference beam;
   whereby the afocal relay allows the first scanning mirror to be spaced a distance away from the beamsplitter without substantially impairing the focus sensing capability of the system.

6. An automatic focusing microscope for examining a target surface and defining an in-focus region, comprising:
   an objective lens conducting an image beam of light reflected from the target surface and defining an optical axis;
   a light source emitting an outgoing reference beam of light, wherein a portion of the outgoing reference beam is reflected from the target surface as an incoming reference beam;
   a photodetector positioned in the path of the incoming reference beam and adapted to generate an electronic signal according to the position of the incoming reference beam on the surface of the photodetector;
   a first scanning minor capable of controllably deflecting the outgoing reference beam and the incoming reference beam; and
   a beamsplitter positioned to reflect the outgoing reference beam, to reflect the incoming reference beam, and to transmit the image beam;

whereby the controllable deflection of the outgoing reference beam allows selection of one or more points on the target surface for generating the electronic signal.

7. The automatic focusing microscope of claim 6, further comprising:
a knife-edge element positioned to obstruct a portion of the outgoing reference beam on a first side of the optical axis and to reflect a portion of the incoming reference beam on the first side of the optical axis to the photodetector.

8. The automatic focusing microscope of claim 6, further comprising a second scanning mirror capable of controllably deflecting the outgoing reference beam and the incoming reference beam, wherein the first scanning mirror is capable of deflecting the outgoing reference beam in a first plane, and the second scanning mirror is capable of deflecting the outgoing reference beam in a second plane not coplanar with the first plane;
whereby the first mirror and the second mirror may be positioned to selectively place the outgoing beam on a point within an area on the target surface.

9. The distance measuring system of claim 8, wherein the position the incoming reference beam impinging on the surface of the photodetector is not dependent on the deflection of the outgoing reference beam.

10. The automatic focusing microscope of claim 6, further comprising:
a servomechanism, wherein the first scanning mirror deflects the outgoing reference beam over a plurality of points on the target surface, and the servomechanism configures the microscope to place the in-focus region at a distance corresponding to at least one of the points selected from the plurality of points.

11. The automatic focusing microscope of claim 10, wherein the servomechanism configures the microscope to place the in-focus region at a distance corresponding to an average of the distances to the plurality of points.

12. The automatic focusing microscope of claim 10, further comprising:
a control circuit selectively configurable to control the servomechanism to place the in-focus region at a distance derived from one or more points selected from the plurality of points.

13. The automatic focusing microscope of claim 6, further comprising:
an image buffer, wherein the captured image data is stored to compile a composite image; and
an image control circuit capable of controlling the imaging device;
whereby the composite image may be compiled from image data successively captured from in-focus regions on the target surface, creating an image with a large depth of focus.

14. The automatic focusing microscope of claim 6, further comprising:
an imaging device configured to capture image data corresponding to a region on the target surface proximate to the deflected outgoing beam;
whereby the captured image data may correspond to in-focus regions on the target surface.

15. The distance measuring system of claim 6, wherein the position of the incoming reference beam impinging on the surface of the photodetector is not dependent on the deflection of the outgoing reference beam.

16. A distance measuring system for use in an optical system capable of examining a target surface and having an objective lens defining a system in-focus region, said system comprising:
a light source emitting an outgoing reference beam of light, wherein a portion of the outgoing reference beam is reflected from the target surface as an incoming reference beam;
a photodetector positioned in the path of the incoming reference beam and adapted to generate an electronic signal according to the position of the incoming reference beam on the surface of the photodetector;
a first scanning mirror capable of controllably deflecting the outgoing reference beam and the incoming reference beam; and
a second scanning mirror capable of controllably deflecting the outgoing reference beam and the incoming reference beam;
wherein the first scanning mirror is capable of deflecting the outgoing reference beam in a first plane, and the second scanning mirror is capable of deflecting the outgoing reference beam in a second plane not coplanar with the first plane, the first scanning mirror deflecting the outgoing reference beam in a periodic manner having a first frequency, the second scanning mirror deflecting the outgoing reference beam in a periodic manner having a second frequency, the first frequency being an integer multiple of the second frequency, and the outgoing reference beam tracing a Lissajous pattern on the target surface.

17. The distance measuring system of claim 16, wherein the Lissajous pattern is a circle.

* * * * *